US006328206B1

(12) United States Patent
Schanz et al.

(10) Patent No.: US 6,328,206 B1
(45) Date of Patent: Dec. 11, 2001

(54) ADJUSTABLE DISPLAY MOUNTING MECHANISM FOR AUTOMATED BANKING MACHINE

(75) Inventors: Kenneth J. Schanz, Richmond Heights; Joseph F. Gagliardi, III, North Canton, both of OH (US)

(73) Assignee: Diebold, Incorporated, North Canton, OH (US)

(*) Notice: Subject to any disclaimer, the term of this patent is extended or adjusted under 35 U.S.C. 154(b) by 0 days.

(21) Appl. No.: 09/115,302

(22) Filed: Jul. 14, 1998

Related U.S. Application Data

(60) Provisional application No. 60/067,318, filed on Nov. 28, 1997.

(51) Int. Cl.[7] ....... G06F 17/60

(52) U.S. Cl. ....... 235/379; 902/30

(58) Field of Search ....... 235/375, 380, 235/379; 903/30; 312/7.2

(56) References Cited

U.S. PATENT DOCUMENTS

| | | | | |
|---|---|---|---|---|
| D. 327,766 | * | 7/1992 | Swaine et al. | D99/28 |
| D. 388,229 | * | 12/1997 | Couch | D99/28 |
| D. 393,528 | * | 4/1998 | Johnson | D99/28 |
| 4,370,006 | * | 1/1983 | Graef et al. | 312/215 |
| 4,616,218 | * | 10/1986 | Bailey et al. | 340/720 |
| 5,112,119 | * | 5/1992 | Cooke et al. | 312/283 |
| 5,452,951 | * | 9/1995 | Peller | 312/310 |
| 5,483,047 | * | 1/1996 | Ramachandran et al. | 235/379 |
| 5,559,671 | * | 9/1996 | Dan et al. | 361/682 |
| 5,573,317 | * | 11/1996 | Cavanaugh et al. | 312/7.2 |
| 5,575,545 | * | 11/1996 | Wang | 312/7.2 |
| 5,621,611 | * | 4/1997 | Kizuya et al. | 361/681 |
| 5,642,922 | * | 7/1997 | Ramachandran et al. | 312/7.2 |
| 5,695,261 | * | 12/1997 | Slesinger et al. | 312/223.6 |
| 5,721,420 | * | 2/1998 | May | 235/379 |
| 5,788,348 | * | 8/1998 | Ramachandran et al. | 312/223.1 |
| 5,845,256 | * | 12/1998 | Pescitelli et al. | 705/4 |
| 5,984,177 | * | 11/1999 | Do et al. | 235/379 |
| 6,036,089 | * | 3/2000 | Oguchi et al. | 235/379 |

OTHER PUBLICATIONS

Product Catalog, Holly Electronic Corp., 2012 Hargtog Dr. , San Jose, CA 95131, Jun. 2000.*

* cited by examiner

*Primary Examiner*—Karl D. Frech
(74) *Attorney, Agent, or Firm*—Ralph E. Jocke; Daniel D. Wasil; Walker & Jocke

(57) ABSTRACT

An automated transaction machine (10) includes a fascia (22) having a display opening (36) therein. Screens (38, 102, 116) of displays (44, 100, 114) are viewable through the screen opening. The displays are supported on an adjustable display support (48) which includes a base member (50) and a second member (68). The base member is horizontally movable relative to a housing of the machine, and the second member is vertically and rotationally movable relative to the base member. Certain displays are supported by connection to the second member or through intermediate support members (104, 118).

26 Claims, 10 Drawing Sheets

ADJUSTABLE DISPLAY MOUNTING MECHANISM FOR AUTOMATED BANKING MACHINE

This application claims benefit of Prov. No. 60/067,318 filed Nov. 28, 1997.

TECHNICAL FIELD

This invention relates to automated banking machines. Specifically, this invention relates to an adjustable mounting mechanism for displays used as part of a customer interface for an automated banking machine or similar machine for conducting transactions.

BACKGROUND ART

Automated banking machines are known in the prior art. A common type of automated banking machine is an automated teller machine (ATM). ATMs may be used by customers to conduct banking transactions. Other types of automated transaction machines are also known in the prior art. Such machines include ticket dispensing machines, bill payment machines, car rental machines and other self-service terminal devices.

Transaction machines typically include a customer interface. The interface is used to provide visual outputs to a customer as well as to receive customer inputs. A common output device for an interface is a visual display which generally includes a CRT type monitor. Displays are used to provide outputs and other information to a customer. In some machines a "touch screen" is used which enables a customer to input instructions by bringing a finger adjacent to the screen of the display. In machines that use a touch screen, the touch screen serves as both an output device and an input device.

Many different types of displays are used in automated transaction machines. The displays may be the conventional type or the touch screen type. Such machines also use displays which are liquid crystal or flat panel types as well as CRT types. Monochrome displays are used in some machines while color displays are used in others. The size of the displays also varies between machines of different types.

Automated transaction machines known in the prior art have each been made to use one particular type of display. If an operator of such a machine wanted a different type of display, it would generally be impractical to modify the physical layout and the electronic components of the machine to accommodate a substantially different type of display. As a result, operators of ATMs and other automated transaction machines often had to acquire a different machine if they wished to have a different display type.

The majority of ATMs and other automated transaction machines known in the prior art have used a mechanism for mounting the display which did not provide for substantial adjustment. In most prior art machines, such adjustment was unnecessary because the display and the customer interface were all made to fit together in precisely aligned relation. There was no concern about misalignment of the display unless the display needed to be replaced. In these circumstances the display needed to be replaced with an identical display, and the original mounting arrangement caused the replacement display to be aligned on the customer interface in the same manner as the original display.

Some prior automated banking machines have included an adjustable monitor mount. The adjustable monitor mount was provided because the display was movable relative to the customer interface. Movement of the display relative to the fascia or other interface increased the possibility for components moving out of alignment. The adjustable monitor mounts enabled adjusting the horizontal position and tilt of the monitor. While this was a substantial improvement over the prior art, no provision was made for vertical adjustment. In addition, these adjustable monitor mounts were not readily adaptable to different types of monitors. Rather, such mounts were made to specifically accommodate a particular type of display.

Thus, there exists a need for an adjustable mount for a display in an automated transaction machine that is vertically, horizontally and angularly adjustable. There further exists a need for a system in an automated transaction machine which enables more readily changing from one type of display to another.

DISCLOSURE OF INVENTION

It is an object of the present invention to provide an automated transaction machine.

It is a further object of the present invention to provide an automated transaction machine which includes a display.

It is a further object of the present invention to provide an automated transaction machine which includes an adjustable support for a display.

It is a further object of the present invention to provide an automated transaction machine that includes an adjustable support for a display that is adjustable vertically, horizontally and angularly.

It is a further object of the present invention to provide an automated transaction machine which includes an adjustable support that is readily adapted to supporting different types of displays.

It is a further object of the present invention to provide an automated transaction machine that is more readily adaptable to using different types of displays.

It is a further object of the present invention to provide a method for adjusting a display in an automated transaction machine.

It is a further object of the present invention to provide a method for changing from one type of display to another in an automated transaction machine.

Further objects of the present invention will be made apparent in the following Best Modes for Carrying Out Invention and the appended claims.

The foregoing objects are accomplished in a preferred embodiment of the invention by an automated transaction machine. The machine includes a fascia. The fascia is part of the customer interface and includes a display opening. The machine further includes a display. The display has a screen which is viewable through the display opening in the fascia.

The machine further includes an adjustable support supporting the display and which enables aligning the screen of the display with the display opening in the fascia. The adjustable support includes a base member. The base member is in supported connection with the housing of the machine and is horizontally movable relative thereto. The base member includes in transverse cross section a U-shaped portion adjacent to the fascia.

The adjustable support further includes a second member which is rotatably movably mounted on the base member. The second member further includes a top flange which extends from the second member towards the base member. A bottom flange is movably mounted on the base member and engages the top flange. A fastening mechanism is provided to hold the top flange and bottom flange in releasibly engaged position.

The display is supported on the second member and is positioned so that its screen is in alignment with the display opening in the fascia through relative movement of the base member and the second member. Alternative types of displays are enabled to be mounted in supported connection with the second member through the use of intermediate support members which extend between the second member and the display. Alternative displays which have smaller screens than the display opening in the fascia may be used. This is done by positioning a screen surround in intermediate relation between the fascia and the display. The screen surround provides for gapless engagement between the fascia and the screen.

The preferred embodiment of the invention may be used with various types of intermediate support members, displays and screen surrounds so that a transaction machine may use various sizes and types of displays. This avoids the cost of having to substantially modify the user interface to accommodate a different type of display.

BEST MODES FOR CARRYING OUT INVENTION

Figure 1:
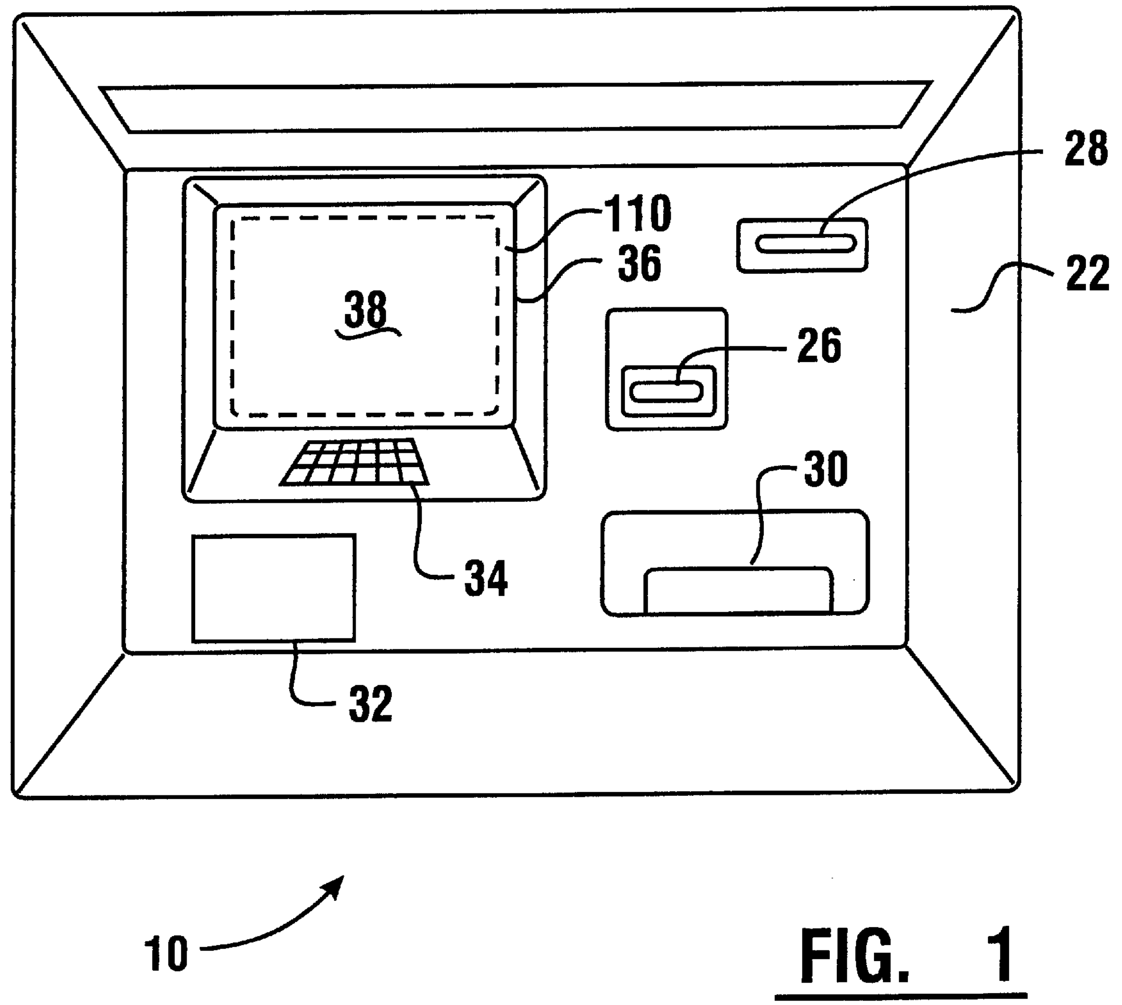
FIG. 1 is a front plan view of a user interface of an automated transaction machine.

Referring now to the drawings and particularly FIG. 1, there is shown therein an automated transaction machine generally indicated 10. In the embodiment shown, the automated transaction machine is an ATM. It should be understood however that embodiments of the present invention may be used in other types of automated transaction machines, such as self-service terminals for ticketing, bill payment, check cashing or dispensing, medication dispensing and for carrying out other types of transactions.

Figure 2:
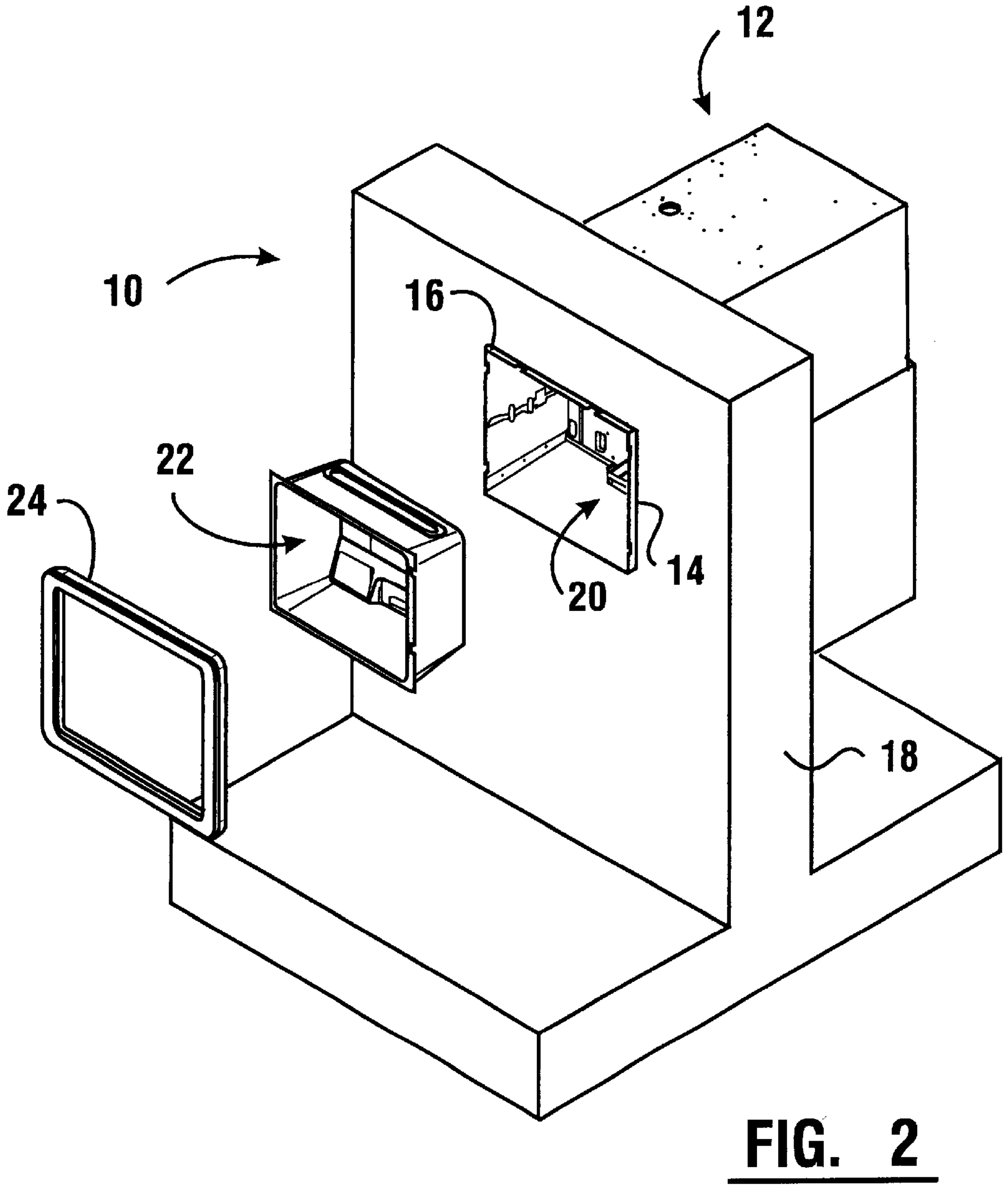
FIG. 2 is an isometric exploded view of the automated transaction machine shown in FIG. 1 mounted in a through-the-wall arrangement.

As shown in FIG. 2, machine 10 is a through-the-wall type ATM. The machine includes a housing 12 which includes a housing portion 14. Housing portion 14 extends through an opening 16 in a building wall 18.

Housing portion 14 bounds a front opening 20. A fascia which serves as part of a customer interface for the machine 10 is positioned in opening 20. A fascia trim ring 24 overlies the perimeter of the fascia in the operative position.

Referring again to FIG. 1, fascia 22 includes input and output devices as well as other devices which are accessed or operated by customers who use the ATM. The fascia includes a card slot 26 through which a customer may input a credit or debit card. A receipt slot 28 is also provided. Receipt slot 28 is used for delivering a paper receipt to a customer who has conducted a transaction at the machine. A currency dispensing opening 30 is provided on the fascia for delivering currency to the customer. Other types of openings or devices may be accessible through the fascia depending on the nature of the machine. Such an opening 32 is shown closed by a cover. Such an opening may provide access to mechanisms for accepting deposits of cash or checks, mechanisms for dispensing items such as tickets; vouchers or stamps, or may provide access to biometric reading devices such as a finger print reader for verifying the identity of a customer. Many types of devices may be provided depending on the type and nature of the transaction machine.

The fascia 22 also has a keypad 34 thereon. Keypad 34 is an input device through which a customer may provide instructions to the machine. The fascia 22 also includes a display opening 36. A screen 38 of a display is visible through the display opening. It should be understood that the display arrangement of fascia 22 is exemplary and other automated transaction machines of the invention may have other types of display arrangements and/or other input and output devices on their customer interfaces.

Figure 3:
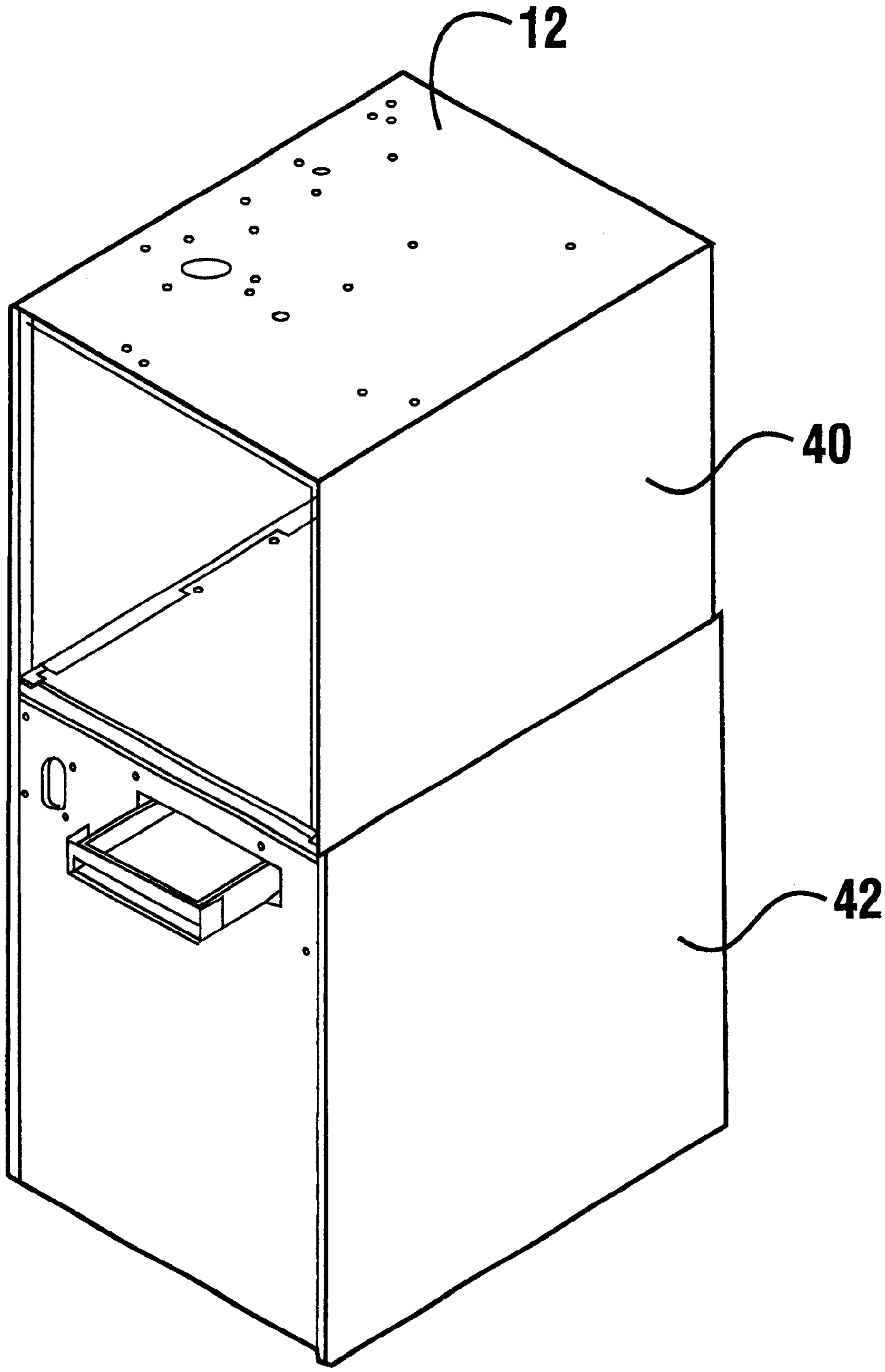
FIG. 3 is an isometric view of a housing portion of the automated transaction machine.

FIG. 3 shows the housing 12 of the machine 10 without housing portion 14. Housing 12 encloses devices which perform the functions in the ATM. Housing 12 includes a top portion 40 and a secure chest 42. Chest 42 in the preferred embodiment is used for housing critical components and valuable documents that are dispensed or received by the machine.

Figure 4:
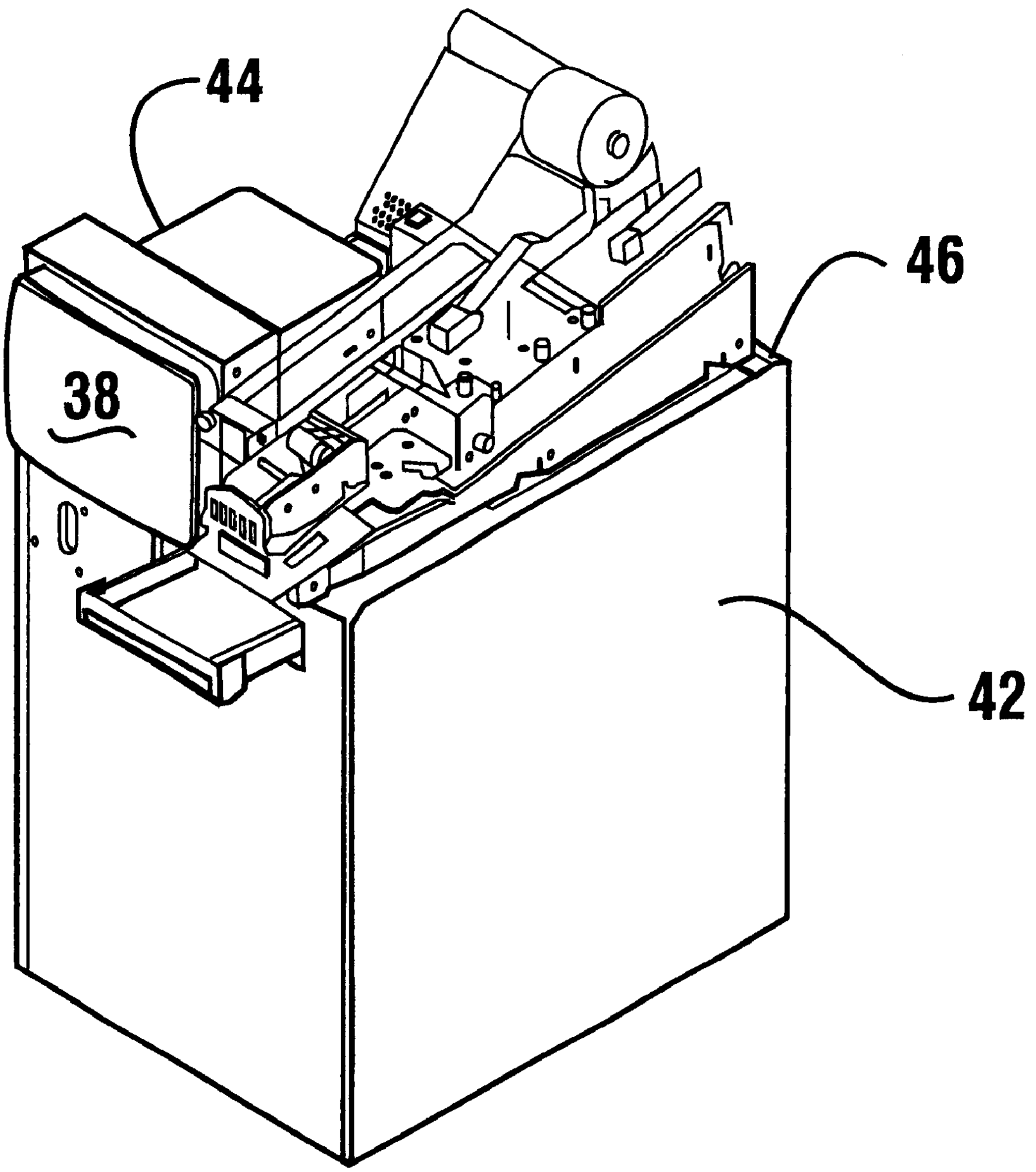
FIG. 4 is an isometric view of an automated transaction machine with a top portion of its housing removed.

While FIG. 3 does not show the devices housed in the top portion 40, FIG. 4 shows such components of the machine. In FIG. 4 the top portion 40 is removed so that the arrangement may be better appreciated. As shown in FIG. 4, screen 38 in the embodiment shown is but a small portion of the display 44. Display 44 in the embodiment shown includes a CRT type display. In an exemplary embodiment it will be considered a color display. It could be of the touch screen type or otherwise. It should be understood however that in other embodiments of the invention different types of displays may be used. The display 44 is supported on the housing of the machine by a generally horizontally extending surface 46 which extends above the chest 42. In embodiments of the invention, horizontal surface 46 may be a surface of a movable tray. In other embodiments surface 46 may be a stationary surface of the machine.

The adjustable support for the display which is described herein is particularly useful in embodiments of the invention such as ATM 10 where the fascia and the display are relatively movably to one another. This may be the result of a construction like that shown for machine 10 wherein the fascia 22 is removable. Alternatively, the display may be movable on a roll out tray or similar structure. The movement of the components relative to one another may result in misalignment, and the ability to readily adjust the alignment is helpful in maintaining the proper operation of the machine.

Figure 5:
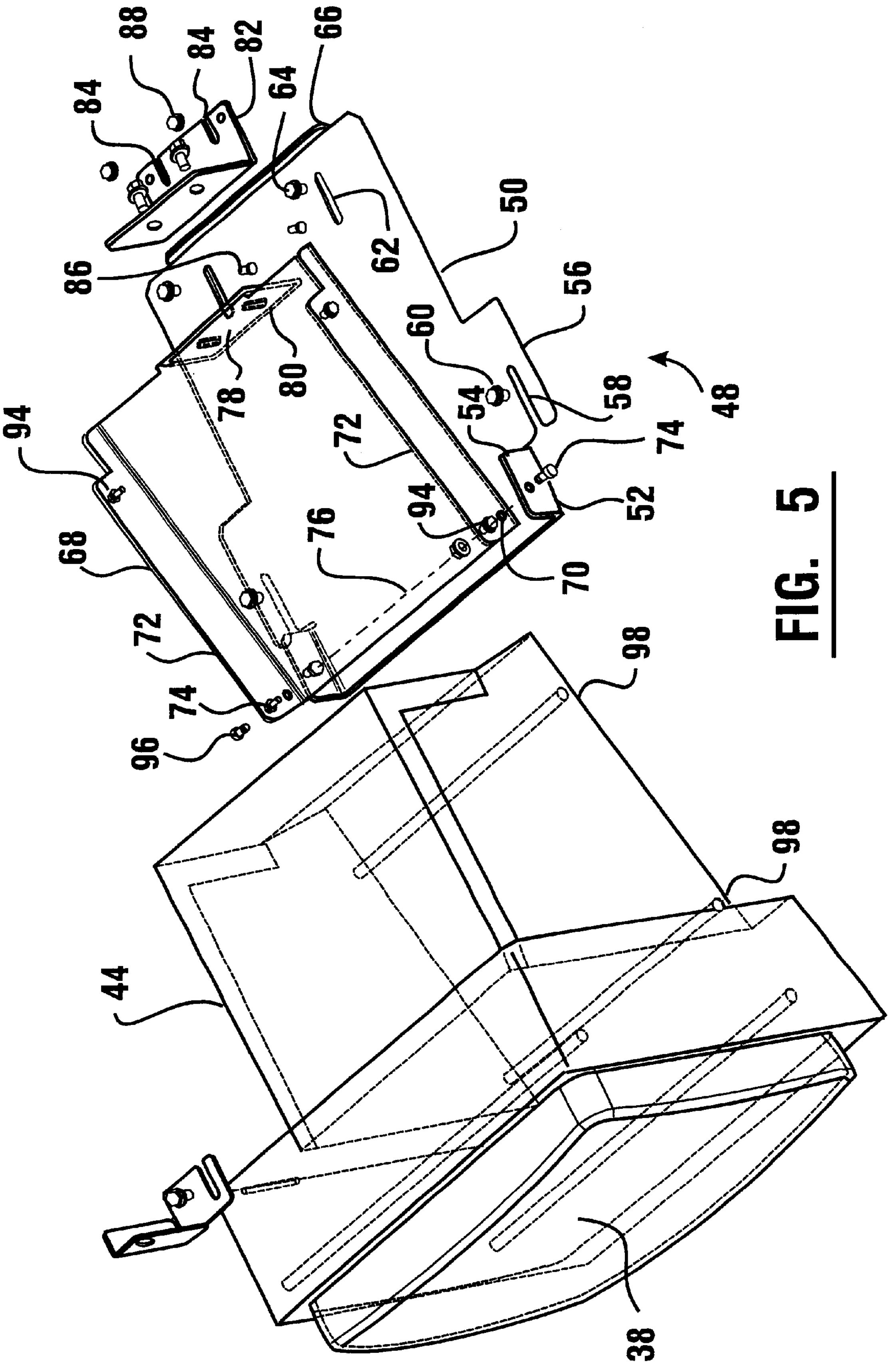
FIG. 5 is an isometric exploded view of an adjustable support used with a first type of display.

FIG. 5 shows display 44 and an adjustable display support generally indicated 48. The adjustable support 48 includes a base member 50. Base member 50 is movably supported on horizontal surface 46. Base surface 50 includes a first portion 52 adjacent to the screen 38 and the fascia. First portion 52 is generally U-shaped in cross section and includes a pair of horizontally spaced, upward extending ears 54. Base member 50 further includes a pair of arms 56. Arms 56 include slots 58 therein. Fastening members 60 extend through slots 58 in the operative position and engage the horizontal surface 46 of the housing. This generally constrains base member 50 to move along the first direction which is the direction of slots 58.

Base member 50 further includes a pair of horizontally spaced further slots 62. Slots 62 extend generally parallel to slots 58. Fastening members 64 extend through slots 62 and engage the housing of the machine. Fasteners 64 in the operative position further constrain the movement of base member 50 along the first direction. Base member 50 further includes a tab 66. Tab 66 is an upward extending tab that facilitates manual engagement of the base member. Fasteners 60 and 64 are used to releasibly hold base member 50 in a fixed position relative to the housing of the machine.

It should be understood that while in the embodiment shown the fastening members are screws or similar fasteners, in other embodiments other types of pins or post members may be engaged in slotted apertures to enable movement of the base member. In addition, other types of interengaging fastening members may be used.

A second member 68 is supported on base member 50. Second member 68 is pivotally mounted to ears 54 through openings 70. Openings 70 extend in upward extending legs 72 of the second member. Shoulder bolts 74 extend through openings in ears 54 and openings 70, and are secured to enable the second member to rotate relative to the base member about an axis of rotation schematically indicated 76.

Figure 6:
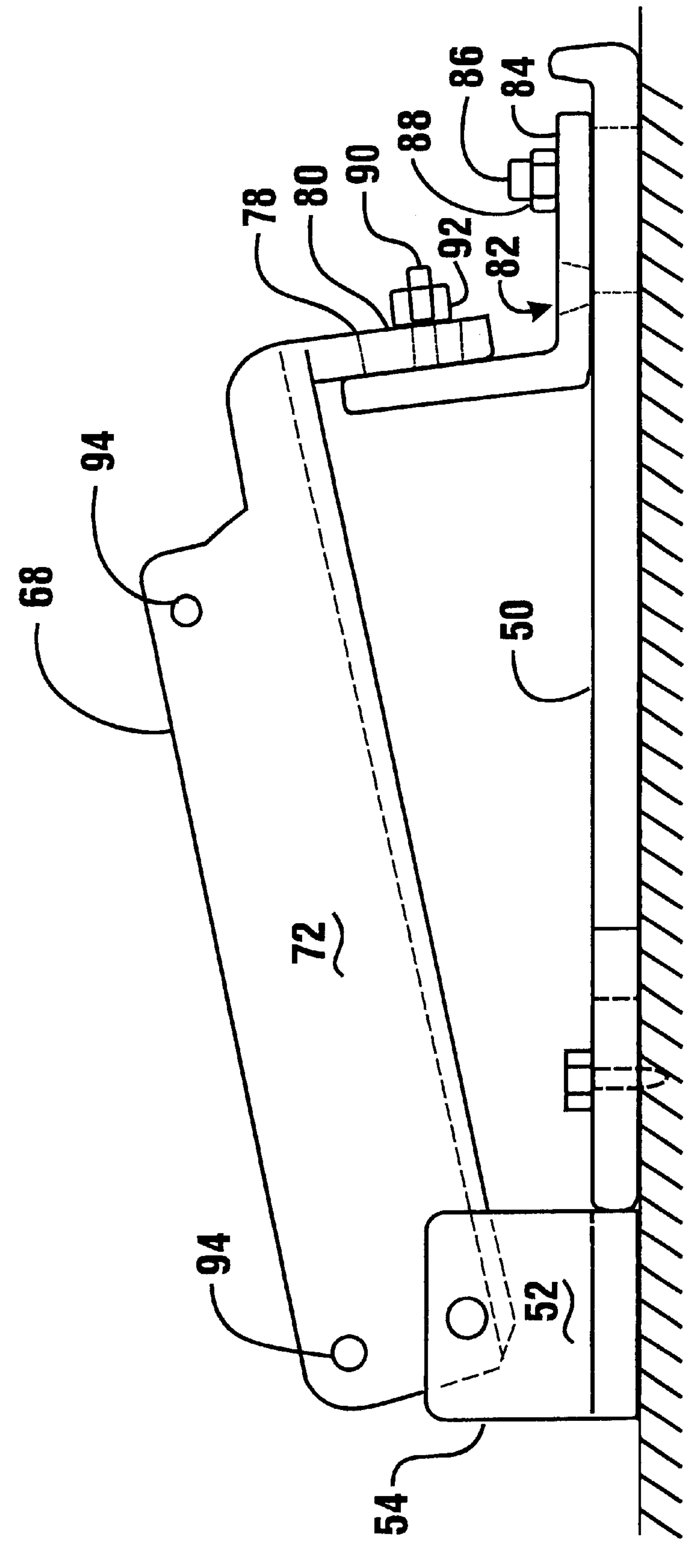
FIG. 6 is a side view of the adjustable support shown in FIG. 5.

A top flange 78 extends downward from second member 68 (see FIG. 6). Top flange 78 includes vertically elongated openings 80 therein. A bottom flange 82 is supported on base member 50. Bottom flange 82 includes slotted openings 84. Pins 86 which extend upwards from base member 50 extend through slotted openings 84 and generally constrain bottom flange 82 to move in the direction of the slotted openings. In the preferred embodiment, pins 86 are threaded and nuts 88 may be releasibly engaged therewith to hold the lower flange in a selected position relative to the base member.

The upward extending portion of lower flange 84 includes a pair of spaced pins 90. Pins 90 are sized to be accepted into elongated openings 80 of the top flange 78. In the preferred embodiment, pins 90 are threaded and nuts 92 provide a releasible fastening mechanism for holding the top flange and the bottom flange in a desired orientation.

It should be understood that while in the embodiment shown the fastening mechanisms for holding the top and bottom flanges, and the base member and bottom flange, are a post member and slotted aperture arrangement, in other embodiments other fastening members and approaches may be used.

As shown in FIG. 5, second member 68 includes openings 94 in the legs 72 thereof. Openings 94 are sized for accepting fasteners 96. Fasteners 96 are extended in each of the four openings 94. Display 44 has a body which includes openings 98 which accept fasteners 96 therein. As a result of this construction, display 44 is enabled to be held between legs 72 in supported relation with second member 68.

As will be appreciated, slots 58 and 62 enable the base member to be moved forward and backward relative to the display opening in the fascia. In addition, the second member 68 may be rotated about the axis of rotation 76. This enables the tilt and vertical position of the display 44 to be selectively adjusted. Once a suitable angular, horizontal and vertical position of the display 44 is determined, the top and bottom flanges may be fixed relative to one another and the bottom flange may be fixed in position relative to the base member. This enables precisely positioning the screen 38 of the display 44 relative to the display opening 36 in the fascia 22.

Figure 7:
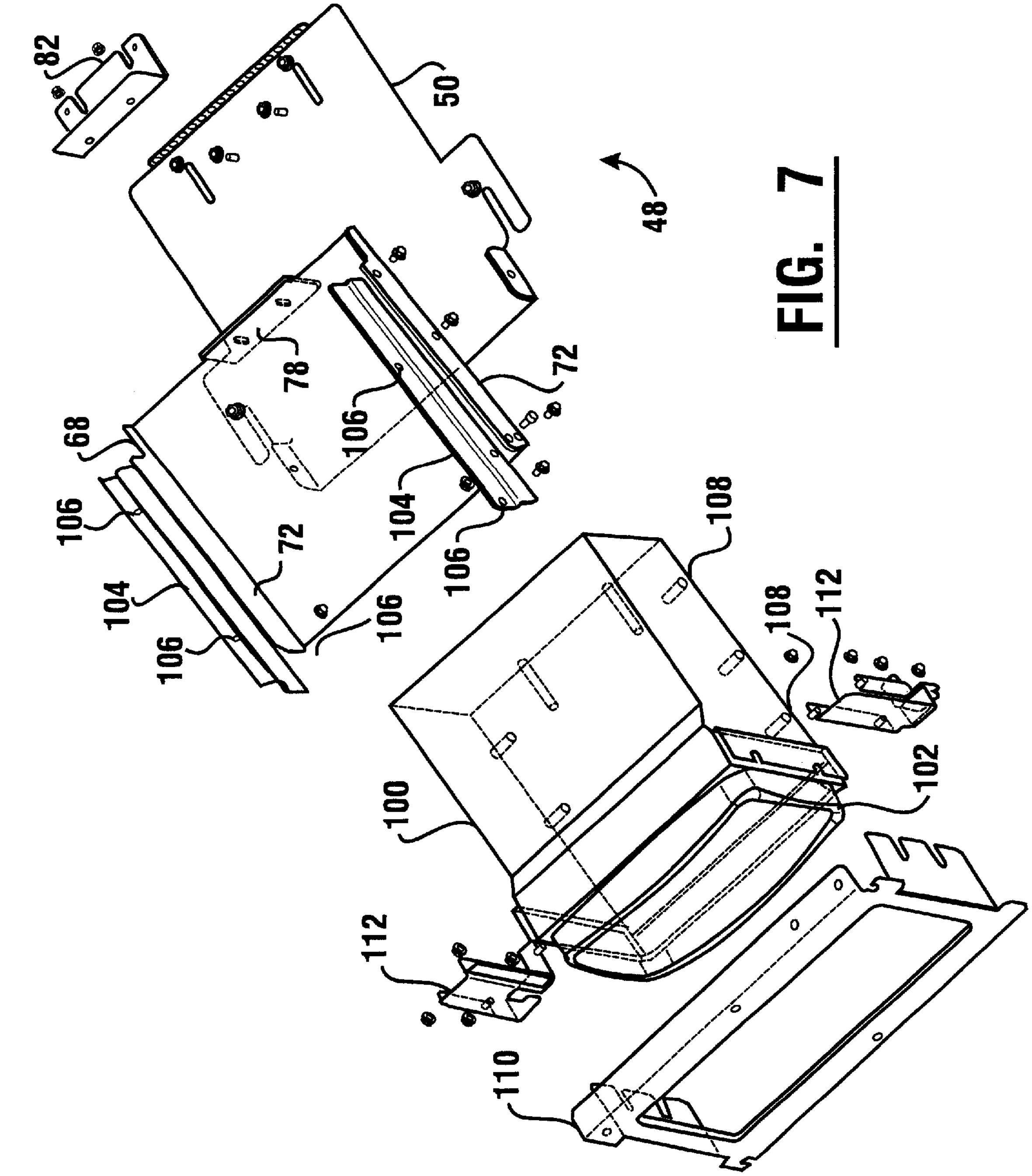
FIG. 7 is an exploded isometric view of the adjustable support used in connection with a second type of display.

FIG. 7 shows the adjustable support previously described modified to support a first alternative display 100. Alternative display 100 has a different body size and configuration and smaller screen 102 compared to the screen of display 44. For purposes of this example display 100 will be a monochrome display.

In this embodiment, base member 50, bottom flange 82 and second member 68 operate in the manner previously described. A pair of flange members 104 are engaged with legs 72 of second member 68. Flange members 104 are attached by fasteners which extend through openings 94.

Flange members 104 include openings 106. Display 100 includes openings 108 therein. Openings 108 accept fasteners which extend through the openings 106 in flange members 104 to hold the display 100 in engaged relation therewith.

As will be appreciated from FIG. 7, display 100 has a body width that is smaller than display 44. The flange members 104 which serve as intermediate support members enable supporting the display 100 on the support 48.

Because the screen 102 of display 100 is smaller than the screen of display 44, a screen surround 110 is positioned adjacent to screen 102. Surround 110 is positioned in intermediate relation between the fascia and the display when the display is in the operative position in the ATM. Surround 110 is mounted to display 100 by surround mounting brackets 112. As shown in FIG. 7, the surround 110 includes slotted openings for engaging the surround mounting brackets which enables the surround to be adjustably positioned relative to the screen.

The adjustable surround in combination with the adjustable display support enables positioning display 100 in display opening 36 in gapless relation. The surround 110 is positionable to fill any gaps about the perimeter of the screen as well as the horizontal space between the display and the fascia opening. The installation of display 100 which is smaller than the fascia opening 36 in the machine is represented by the dashed line in the display opening in FIG. 1.

Figure 10:
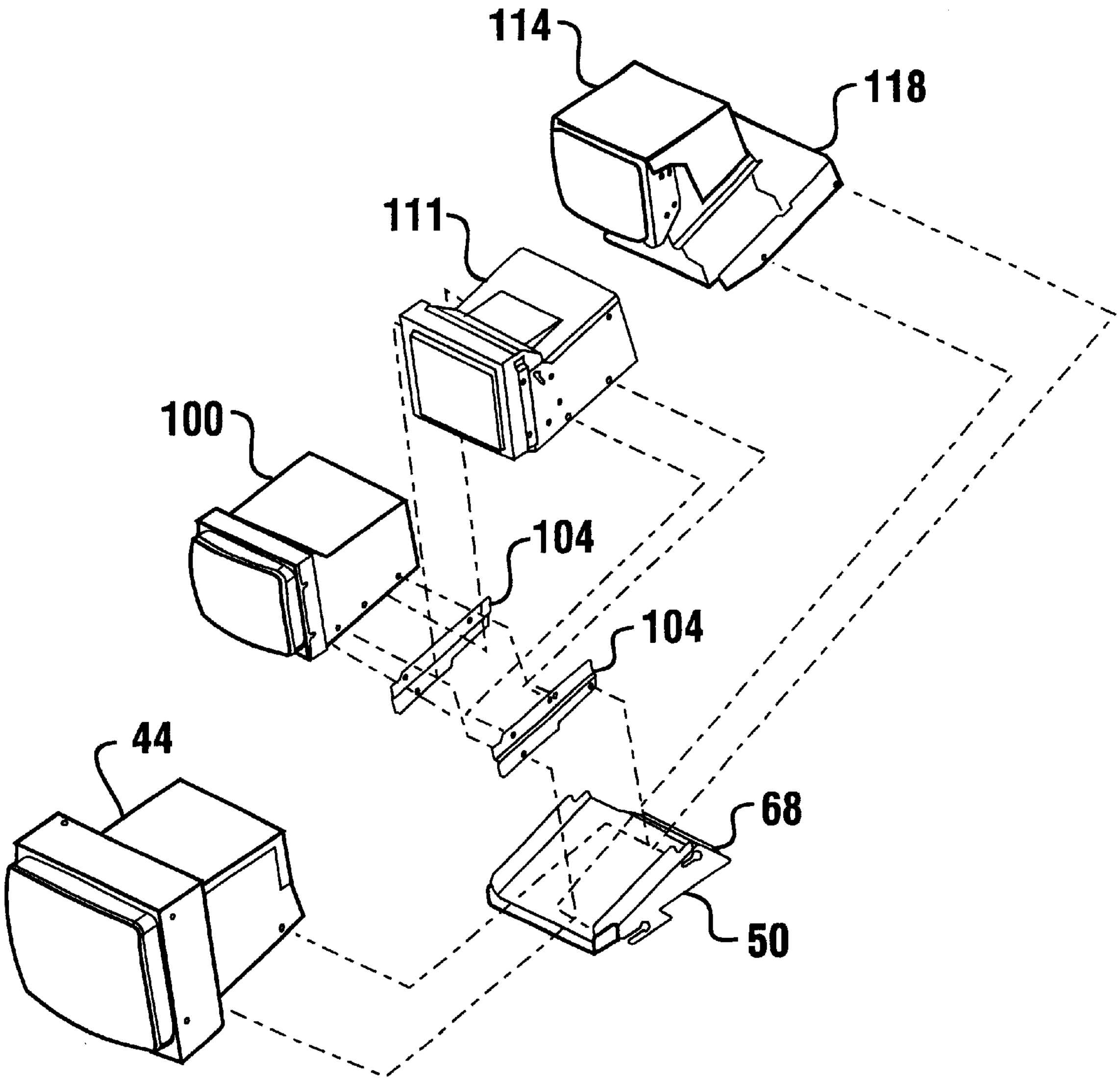
FIG. 10 is an isometric exploded view of the adjustable display support and how it is used to support various types of displays.

FIG. 10 shows another alternative display 111 which includes an LCD type display. Display 111 has a similar body width and mounts on flanges 104 in a manner similar to display 100. Display 111 also has a similar screen size to display 100, but in other embodiments may have a different screen size despite having a similar body size.

Figure 8:
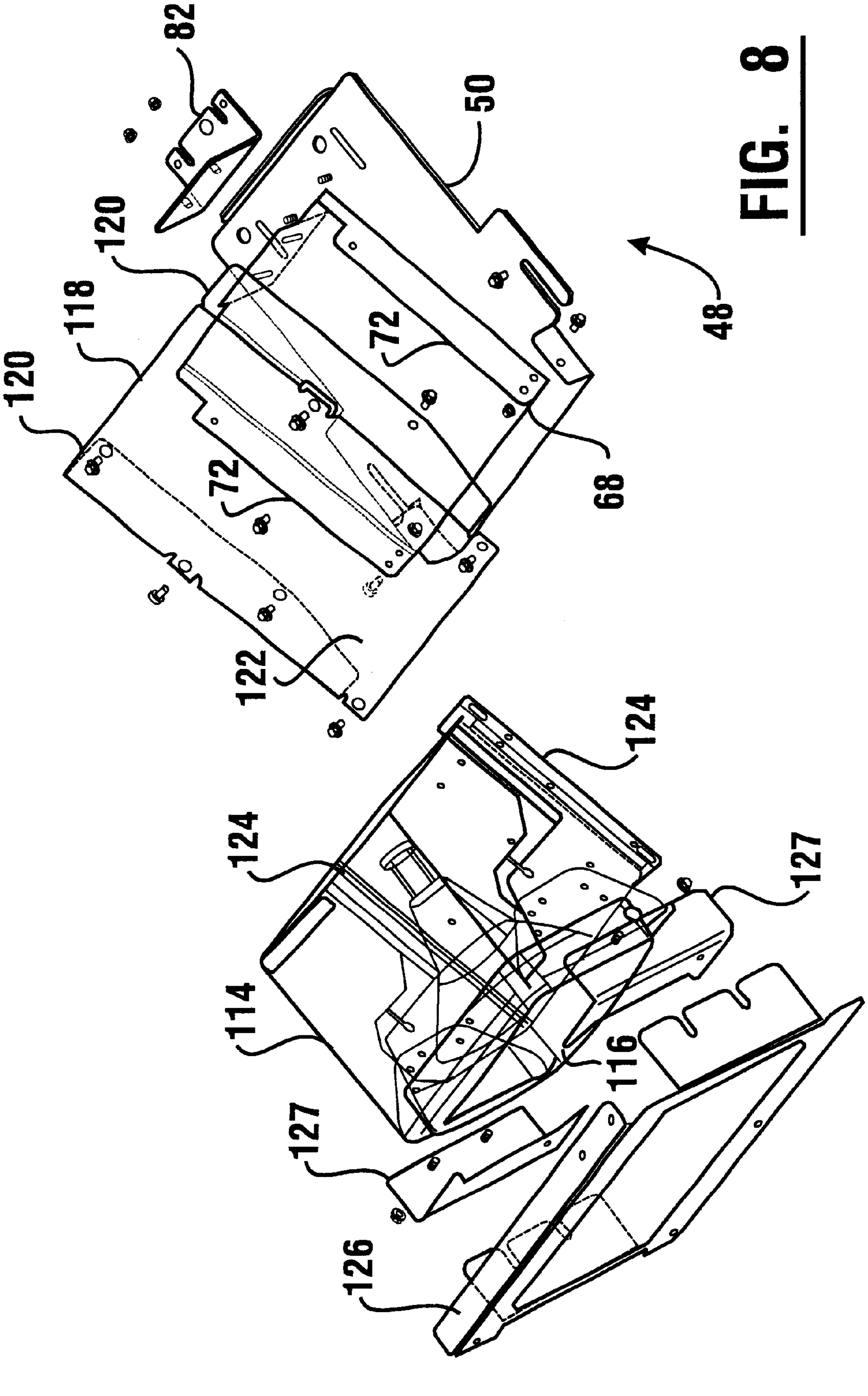
FIG. 8 an isometric exploded view of the adjustable support used in connection with a third type of display.
Figure 9:
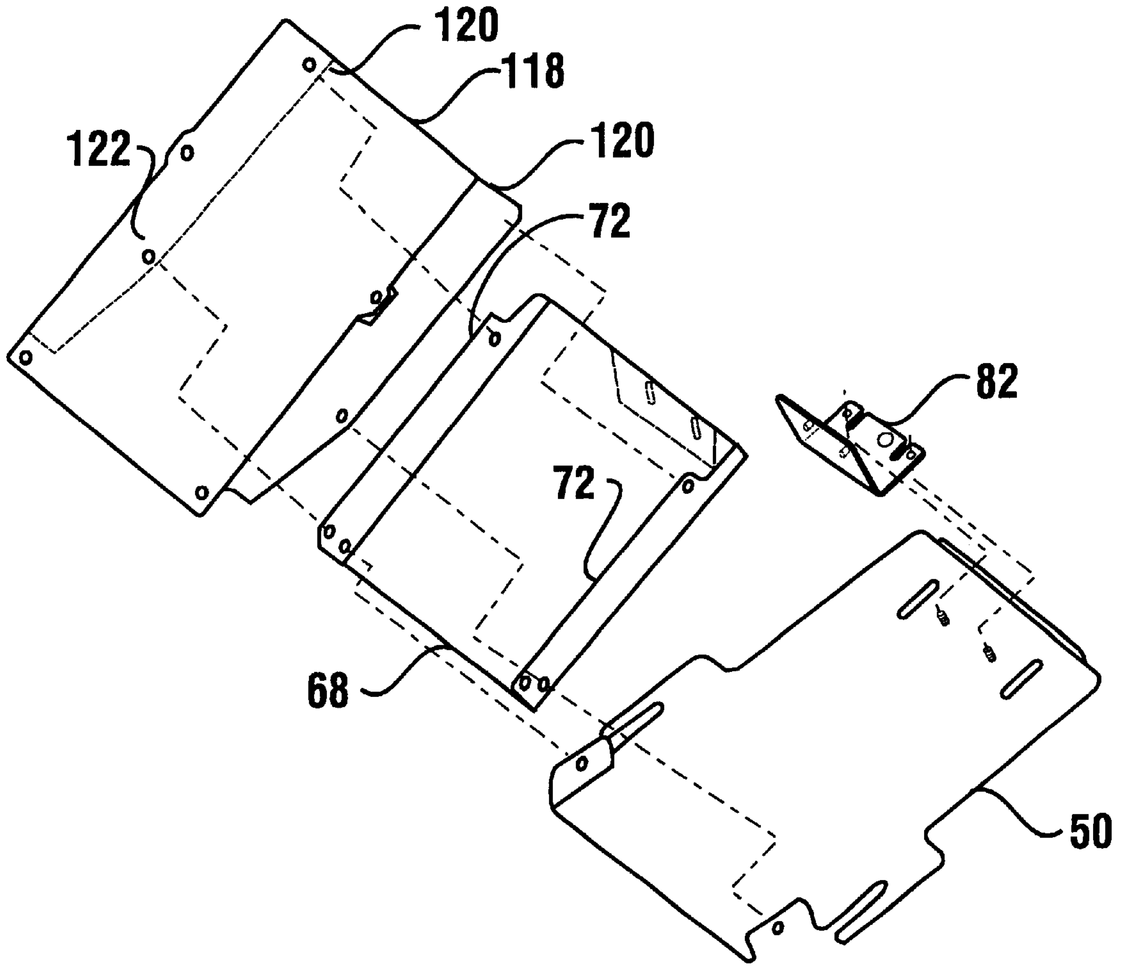
FIG. 9 is an isometric exploded view of the base member, second member and third member of the adjustable display support.

Yet another alternative display 114 is shown supported on display support 48 in FIG. 8. Display 114 has a screen 116 that is different in size and configuration from the other displays. Display 114 also has a different body size from the other displays already discussed. Display 114 could be monochrome or color, touch screen or otherwise.

In this alternative configuration, yet another intermediate support member is engaged with the second member 68. This intermediate support member is a third member 118. Third member 118 is a generally inverted U-shaped member having downward extending projections 120. Projections 120 engage legs 72 of second member 68 through releasible fasteners. Projections 120 extend downward from a generally planar top surface 122 of the third member.

Display 114 includes engaging brackets 124 which extend along each side of the body thereof. Engaging brackets 124 include slotted openings therein. A fastening mechanism is used to releasibly hold the engaging brackets and display 114 to the top surface 122. This fastening mechanism includes fasteners which engage in openings in the top surface 122. This provides a selectively engageable slotted aperture and post member arrangement which enables display 114 to be moved relative to top surface 122 in a direction generally parallel to projections 120. Such movement also is operative to modify the vertical position of the display 114.

A screen surround 126 is positioned in supported connection with display 114. Surround 126 like surround 110 enables mounting display 114 in the fascia opening in generally gapless relation. Surround 126 is movably mounted to the display through surround mounting brackets 127.

The adjustable display support enables changing the displays used within a transaction machine from one type to another without having to modify the fascia. As will be appreciated from the foregoing description, this is accomplished by engaging or removing the intermediate support members which connect the second member 68 to the display. A surround appropriate for the screen size and configuration of the display is added while the existing surround, if any, is removed. The relative position of the surround as well as the adjustable support is moved so that when the fascia is in the operative position, the fascia engages the surround and the screen in generally gapless relation.

It should be understood that in the various embodiments appropriate seals or similar mechanisms may be provided for insuring that a generally fluid tight, gapless fit is achieved between the screen, the surround and the fascia. Of course, additional electronic drivers or other appropriate electronic components for use of the new display type must also be provided in the machine. However, this can be done through appropriate programming and the addition of the necessary interfaces for the type of display to be used. This is generally done by adding or changing components in an area of the machine that is not visible to a user, and does not require a significant modification to the physical machine structure.

Thus the preferred embodiment of the invention enables changing, for example, from a monochrome monitor to a color monitor without having to modify the fascia opening of the machine. Likewise, changing from a touch screen to a non touch screen or from a smaller screen display to a larger screen display is a matter of disconnecting the current display and intermediate members, and installing a new display and intermediate members, if any. In the preferred embodiment this can be readily done by a service technician in the field, avoiding the need to return the transaction machine to the factory. Upgrading in this manner presents an opportunity for significant cost savings compared to prior approaches.

Further, in the preferred embodiment where the machine fascia is removable from the front opening of the housing, it is easier to change to a different type of fascia. This enables more readily changing not only the screen opening but other customer actuated devices used in the customer interface of the machine. This also facilitates providing upgrades in the field.

Thus, the preferred embodiment of the present invention achieves the above stated objectives, eliminates difficulties encountered in the use of prior devices, systems and methods, and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the foregoing descriptions and illustrations are by way of examples and the invention is not limited to the details shown or described.

In the following claims any feature described as a means for performing a function shall be construed as encompassing any means known to be capable of performing the recited function and shall not be limited to the means shown or described as performing the recited function in the foregoing description or mere equivalents thereof.

Having described the features, discoveries and principles of the invention, the manner in which it is constructed and operated, and the new and useful results attained; the new and useful structures, devices, elements, arrangements, parts, combinations, systems, operations, methods and relationships are set forth in the appended claims.

We claim:

1. A transaction machine apparatus comprising:

a housing;

a fascia in supporting connection with the housing, wherein the fascia includes a display opening;

a display including a screen, wherein the display comprises either a first display including a first body of a first size or a second display including a second body of a second size different from the first body size;

an adjustable support, wherein the support is operative to support the display, the support including:

a base member in supporting connection with the housing of the machine; and a second member in supporting connection with the base member, wherein the second member is movably mounted relative to the base member, wherein the second member is movable both rotationally and vertically relative to the base member;

whereby the adjustable support is movably positionable relative to the housing to bring the screen of the display into aligned viewable relation with the display opening of the fascia when the display comprises the first display and when the display comprises the second display.

2. The apparatus according to claim 1 wherein the first display has a first screen of a first size and wherein the second display has a second screen of a second size different from the first size, and wherein the adjustable support is movably positionable to bring the first screen into aligned viewable relation with the fascia opening when the one display is the first display, and to bring the second screen into aligned viewable relation with the fascia opening when the one display is the second display.

3. The apparatus according to claim 1 wherein the first display is a monochrome display and the second display is a color display.

4. The apparatus according to claim 1 wherein the first display includes a CRT display and the second display is an LCD display.

5. The apparatus according to claim 1 wherein the first display includes a touch screen and the second display does not include a touch screen.

6. A transaction machine apparatus comprising:

a housing;

a fascia in supporting connection with the housing, wherein the fascia includes a display opening;

a display including a screen;

an adjustable support, wherein the adjustable support comprises:

a base member, the base member in supporting connection with the housing of the machine, the base member including in transverse cross section a U-shaped portion;

a second member, the second member rotationally movably connected adjacent a first end of the second member to the U-shaped portion of the base member, the second member in operative connection adjacent a second end with a top flange, the top flange extending from the second member towards the base member; and a bottom flange supported on the base member, the bottom flange extending from the base member towards the second member and engaging the top flange, and further comprising a fastening mechanism releasibly holding the top flange and the bottom flange in relatively fixed relation;

wherein the adjustable support is movably positionable relative to the housing to bring the screen of the display into aligned viewable relation with the display opening on the fascia.

7. The apparatus according to claim 6 wherein the base member of the support includes a body having a pair of opposed arms, the arms in supported relation with the housing, wherein a slot extends in each arm, wherein the slots extend along a first direction, wherein a fastening member in operative connection with the housing extends in each slot, and wherein the base member is selectively movable in the first direction or is held in a fixed position relative to the housing by the fastening member.

8. The apparatus according to claim 6 wherein the fastening mechanism selectively holding the top flange and the bottom flange includes a post member and slotted aperture.

9. The apparatus according to claim 6 wherein the bottom flange is movably mounted relative to the base member, wherein the bottom flange is movable in a direction generally perpendicular to an axis of rotation about which the second member is movable relative to the base member.

10. The apparatus according to claim 9 and further comprising a further fastening mechanism for releasibly holding the bottom flange in fixed relative relation to the base member, wherein the further fastening mechanism includes a post member and a slotted aperture.

11. The apparatus according to claim 6 wherein the second member includes in cross section a pair of spaced legs, the legs extending from the second member in a direction away from the base member, and wherein the display extends between the legs.

12. The apparatus according to claim 11 wherein the support further includes a pair of flange members, wherein each flange member is in supporting connection with one of the legs and wherein the display is supported by the flange members.

13. The apparatus according to claim 11 and further comprising a third member supported by the second member, wherein the display is supported by the third member.

14. The apparatus according to claim 13 wherein the third member includes a pair of spaced projections, each of the projections being operatively engaged with one of the legs of the second member.

15. The apparatus according to claim 13 wherein the third member includes a top surface in supporting connection with the display, and wherein the display has an engaging bracket operatively engaging the top surface, and further comprising a further fastening mechanism including a slotted aperture and post member, wherein the further fastening mechanism releasibly holds the top surface relative to the engaging bracket.

16. The apparatus according to claim 6, and further comprising a surround extending intermediate of the screen and the display opening, whereby the surround enables displays having different sized screens to extend in generally gapless relation in the screen opening.

17. A transaction machine apparatus comprising:

a fascia including a display opening therethrough;

a display, wherein the display is viewable through the display opening in the fascia;

an adjustable support, wherein the support is operative to support the display, the support including:

a base member supported on a housing of the machine; and a second member in supporting connection with the base member, wherein the second member is movably mounted relative to the base member, wherein the second member is movable both rotationally and vertically relative to the base member.

18. The apparatus according to claim 17 wherein the base member is movably mounted in supporting connection with the housing, wherein the base member is movable relative to the housing in a generally horizontal direction.

19. A method comprising the steps of:

supporting a base member on a housing of an automated transaction machine, the base member including in transverse cross section a U-shaped portion;

further supporting a second member on the base member, the second member being movably mounted on the base member both in a rotational direction and a vertical direction;

mounting a display in supported connection with the second member; and moving the second member relative to the base member to align the display with a display opening in a fascia of the machine.

20. The method according to claim 19 wherein the display includes a screen, and prior to the moving step further comprising the step of positioning a surround in intermediate relation between the display and the display opening, wherein in the moving step the surround extends between the screen and the display opening.

21. The method according to claim 19 and prior to the moving step further comprising the steps of:

removing a second display from supported connection with the second member; and disconnecting an intermediate support member from supporting connection with the second member.

22. The method according to claim 21 and prior to the mounting step further comprising the step of further removing a surround from a position intermediate of the fascia opening and the second display.

23. The method according to claim 21 wherein the first display has a first screen and the second display has a second screen, and wherein a size of the first screen differs from a size of the second screen.

24. The method according to claim 19 and prior to the mounting step further comprising the step of connecting an intermediate support member in operative connection with the second member, wherein in the mounting step the display is supported by the intermediate support member.

25. The method according to claim 24 and prior to the moving step further comprising the step of further connecting a monitor surround in intermediate relation between the display and the display opening of the fascia.

26. A transaction machine apparatus comprising:

a fascia including a display opening therethrough;

a display, wherein the display is viewable through the display opening in the fascia;

an adjustable support, wherein the support is operative to support the display, the support including:

a base member in supporting connection with a housing of the machine; and a second member in supporting connection with the base member, wherein the second member is movably mounted relative to the base member, wherein the second member is movable both rotationally and vertically relative to the base member;

whereby the display is enabled to be selectively positioned relative to the display opening.

* * * * *